(12) United States Patent
Wakahoi et al.

(10) Patent No.: US 7,759,014 B2
(45) Date of Patent: Jul. 20, 2010

(54) FUEL CELL HAVING A SEAL MEMBER

(75) Inventors: Toshiya Wakahoi, Utsunomiya (JP);
Hiroyuki Tanaka, Utsunomiya (JP);
Yosuke Fuji, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1065 days.

(21) Appl. No.: 11/287,033

(22) Filed: Nov. 22, 2005

(65) Prior Publication Data
US 2006/0110651 A1 May 25, 2006

(30) Foreign Application Priority Data
Nov. 25, 2004 (JP) .............................. 2004-341060

(51) Int. Cl.
*H01M 8/02* (2006.01)
*H01M 8/10* (2006.01)
(52) U.S. Cl. ...................................... 429/457; 429/479
(58) Field of Classification Search ................... 429/26, 429/34, 35, 36, 37, 38, 39
See application file for complete search history.

(56) References Cited

U.S. PATENT DOCUMENTS

| | | | |
|---|---|---|---|
| 5,472,801 A | 12/1995 | Mattejat et al. | |
| 2003/0129474 A1 | 7/2003 | Kikuchi et al. | |
| 2004/0106028 A1* | 6/2004 | Sugiura et al. | 429/26 |
| 2004/0115512 A1* | 6/2004 | Fujii et al. | 429/38 |
| 2004/0121215 A1 | 6/2004 | Fujii et al. | |
| 2004/0219410 A1* | 11/2004 | Tanaka et al. | 429/26 |
| 2005/0074652 A1* | 4/2005 | Choi | 429/32 |
| 2005/0142416 A1 | 6/2005 | Takai et al. | |
| 2005/0238942 A1 | 10/2005 | Kikuchi et al. | |
| 2007/0042261 A1 | 2/2007 | Kohyama et al. | |

FOREIGN PATENT DOCUMENTS

| | | |
|---|---|---|
| CA | 2300008 A1 | 9/2000 |
| CA | 2414979 A1 | 6/2003 |
| DE | 10260626 A1 | 7/2003 |
| JP | 6-218275 | 8/1994 |
| JP | 2002-15751 | 1/2002 |
| JP | 2002-083614 | 3/2002 |
| JP | 2003-197221 | 7/2003 |
| WO | WO-2004/088779 A1 | 10/2004 |

OTHER PUBLICATIONS

United Kingdom Search Report Application No. GB0524057.7, dated Jan. 25, 2006.
German Office Action for Application No. 102005056341.4, dated Oct. 9, 2007.
Japanese Office Action for Application No. 2004-341060, dated Jun. 23, 2009.

* cited by examiner

*Primary Examiner*—Dah-Wei D Yuan
*Assistant Examiner*—Stephan Essex
(74) *Attorney, Agent, or Firm*—Lahive & Cockfield, LLP; Anthony A. Laurentano

(57) ABSTRACT

A power generation cell includes a membrane electrode assembly, and a cathode side metal separator and an anode side metal separator sandwiching the membrane electrode assembly. A seal member covers inner surfaces of inlet through holes. The seal member includes a plurality of flow grooves and a plurality of receivers. The flow grooves guide a fuel gas from the inlet through holes to a fuel gas flow field through an inlet buffer. The receivers directly contact an anode.

10 Claims, 9 Drawing Sheets

18

FUEL CELL HAVING A SEAL MEMBER

BACKGROUND OF THE INVENTION

1. Field of the Invention

The present invention relates to a fuel cell formed by stacking a membrane electrode assembly and first and second metal separators in a stacking direction. The membrane electrode assembly includes a first electrode, a second electrode, and an electrolyte membrane interposed between the first electrode and the second electrode. The surface area of the second electrode is larger than the surface area of the first electrode. A reactant gas passage for at least one reactant gas extends through the fuel cell in the stacking direction.

2. Description of the Related Art

For example, a polymer electrolyte fuel cell employs a polymer ion exchange membrane as a solid polymer electrolyte membrane. The solid polymer electrolyte membrane is interposed between an anode and a cathode to form a membrane electrode assembly (MEA). The membrane electrode assembly is sandwiched between separators to form a unit of a power generation cell for generating electricity. In use, generally, a predetermined number of the power generation cells are stacked together to form a fuel cell stack.

In the power generation cell, a fuel gas such as a gas chiefly containing hydrogen (hereinafter also referred to as the "hydrogen-containing gas") is supplied to the anode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy. A gas chiefly containing oxygen or air (hereinafter also referred to as the "oxygen-containing gas") is supplied to the cathode. At the cathode, hydrogen ions from the anode combine with the electrons and oxygen to produce water.

In the power generation cell, a fuel gas flow field (reactant gas flow field) for allowing the fuel gas to flow along the anode and an oxygen-containing gas flow field (reactant gas flow field) for allowing the oxygen-containing gas to flow along the cathode are formed in the surfaces of the separators. Further, a coolant flow field for allowing a coolant to flow in the direction parallel to the surfaces of the separators is formed in at least one of positions between the power generation cells.

As one type of the fuel cell, an internal manifold type fuel cell is known. In the internal manifold type fuel cell, reactant gas supply passages, reactant gas discharge passages, a coolant supply passage and a coolant discharge passage extend through outer regions of the power generation cells in the stacking direction. In the fuel cell, the reactant gas supply passage and the reactant gas discharge passage are connected by a connection region. However, the connection region intersects the seal line which is formed around the reactant gas supply passage and the reactant gas discharge passage. Therefore, for example, a reinforcement member needs to be provided along the seal line.

In this regard, Japanese Laid-Open Patent Publication No. 2002-83614 proposes a fuel cell in which it is possible to fully maintain the hermetically sealed state with a simple structure. As shown in FIG. 9, the fuel cell includes a unit cell 1 and separators 2, 3 sandwiching the unit cell 1. Another separator 4 is stacked on the separator 3.

A manifold 5 for supplying hydrogen extends through the unit cell in the stacking direction. The manifold 5 is connected to a groove 6 formed on one surface of the separator 3. The separator 3 has a through hole 7. The through hole 7 is connected to a fuel flow field 8 formed on the other surface of the separator 3. Seal members 9a, 9b are formed around the manifold 5 between the unit cell 1 and the separators 2, 3.

In the fuel cell, since the fuel flow field 8 is connected to the manifold 5, the groove 6 is formed on the surface opposite to the fuel flow field 8, and the groove 6 is connected to the fuel flow field 8 through the through hole 7. According to the disclosure, with a simple structure without any grooves which intersect the seal members 9a, 9b, the desired sealing performance can be achieved.

In the conventional technique, the separators 2 to 4 are carbon separators. Therefore, a flow field having a desired shape can be formed on both surfaces of the separators 2 to 4 individually. However, in the case of using a metal separator instead of the carbon separator, and the reactant gas flow field and the coolant flow field are formed on both surfaces of the metal separator, respectively, the shape of the reactant gas flow field formed on one surface of the metal separator limits the shape of the coolant flow field formed on the other surface of the metal separator. Further, since the metal separator is formed by press forming, in particular, for example, the shape at the end of the flow field cannot be designed freely.

Thus, if the conventional separators 2 to 4 are fabricated by using metal, it may not be possible to reliably provide the connection region connecting the through hole 7 and the fuel flow field 8. In this case, it is not possible to smoothly supply the fuel from the through hole 7 to the fuel flow field 8, and the power generation performance is deteriorated. Further, the unit cell 1 cannot be held by the metal separator, and the unit cell 1 may be damaged undesirably when a tightening load is applied to the unit cell 1.

SUMMARY OF THE INVENTION

A main object of the present invention is to provide a fuel cell in which it is possible to maintain the desired power generation performance, and prevent damage of a membrane electrode assembly with a simple and compact structure.

The present invention relates to a fuel cell formed by stacking a membrane electrode assembly between a pair of first and second metal separators in a stacking direction. The membrane electrode assembly includes first and second electrodes and an electrolyte interposed between the first and second electrodes. The surface area of the second electrode is larger than the surface area of the first electrode. A reactant gas passage for at least one reactant gas extends through the fuel cell in the stacking direction.

The first metal separator comprises a reactant gas flow field formed on a first surface facing the first electrode for supplying the reactant gas to the first electrode, and a through hole for allowing the reactant gas supplied into the second surface of the first metal separator to move toward the first surface to supply the reactant gas to the reactant gas flow field. A seal member is formed integrally with the first metal separator, and the seal member includes a flow groove for guiding the reactant gas from the through hole toward the reactant gas flow field and a receiver which directly contacts the first electrode.

According to the present invention, the reactant gas flowing from the second surface to the first surface of the first metal separator through the through hole is smoothly and reliably supplied to the fuel gas flow field through the flow groove of the seal member.

The seal member includes the flow groove and the receiver. The receiver directly contacts the first electrode. The surface area of the first electrode is smaller than the surface area of the second electrode. In this structure, when a tightening load is applied to the fuel cell in the stacking direction, the first electrode is reliably held by the receiver. Thus, with a simple and compact structure, it is possible to suitably prevent damage of the membrane electrode assembly, and achieve the uniform surface pressure applied to the membrane electrode assembly to improve power generation performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
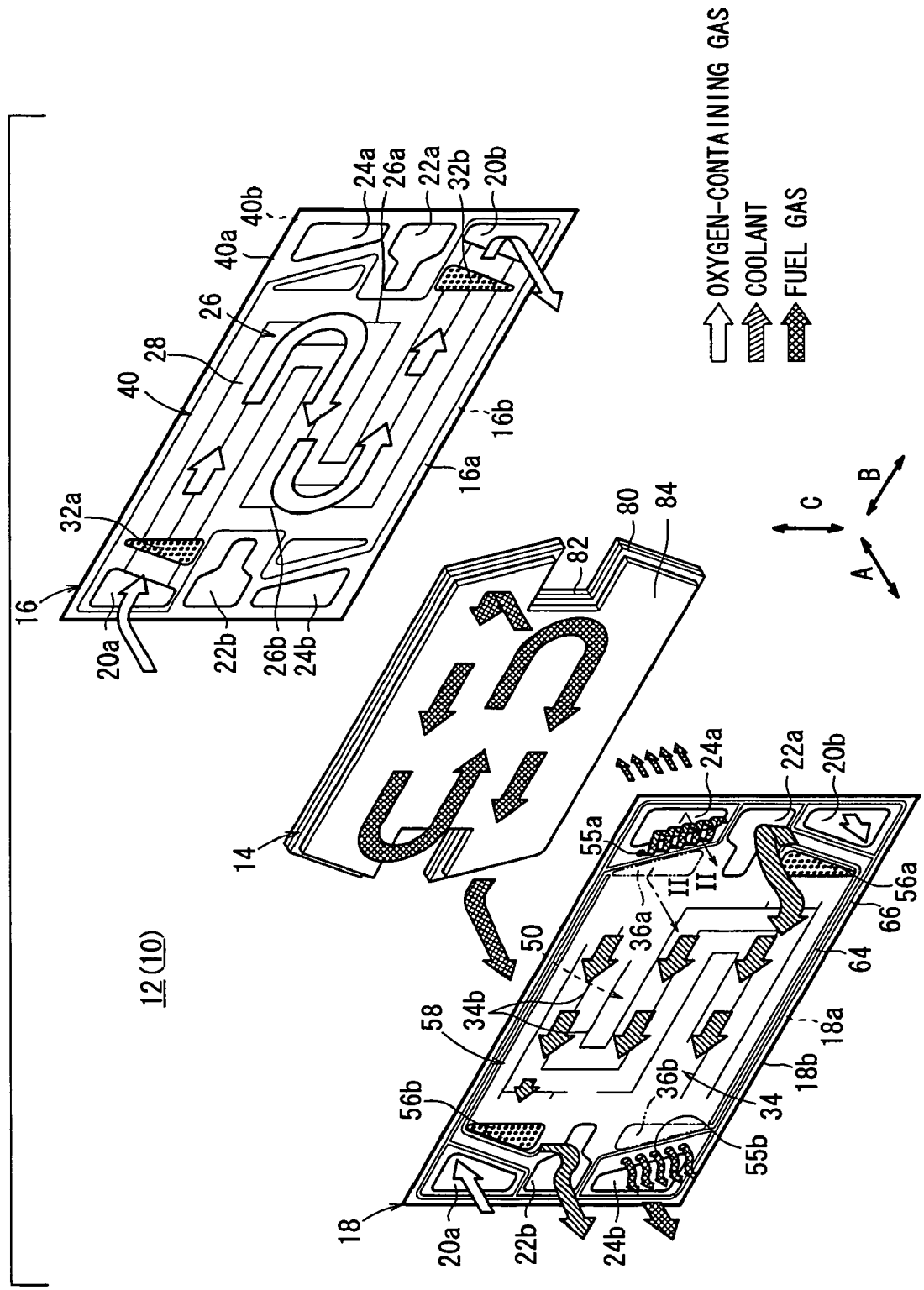
FIG. 1 is a perspective view schematically showing main components of a power generation cell of a fuel cell according to a first embodiment of the present invention.
Figure 2:
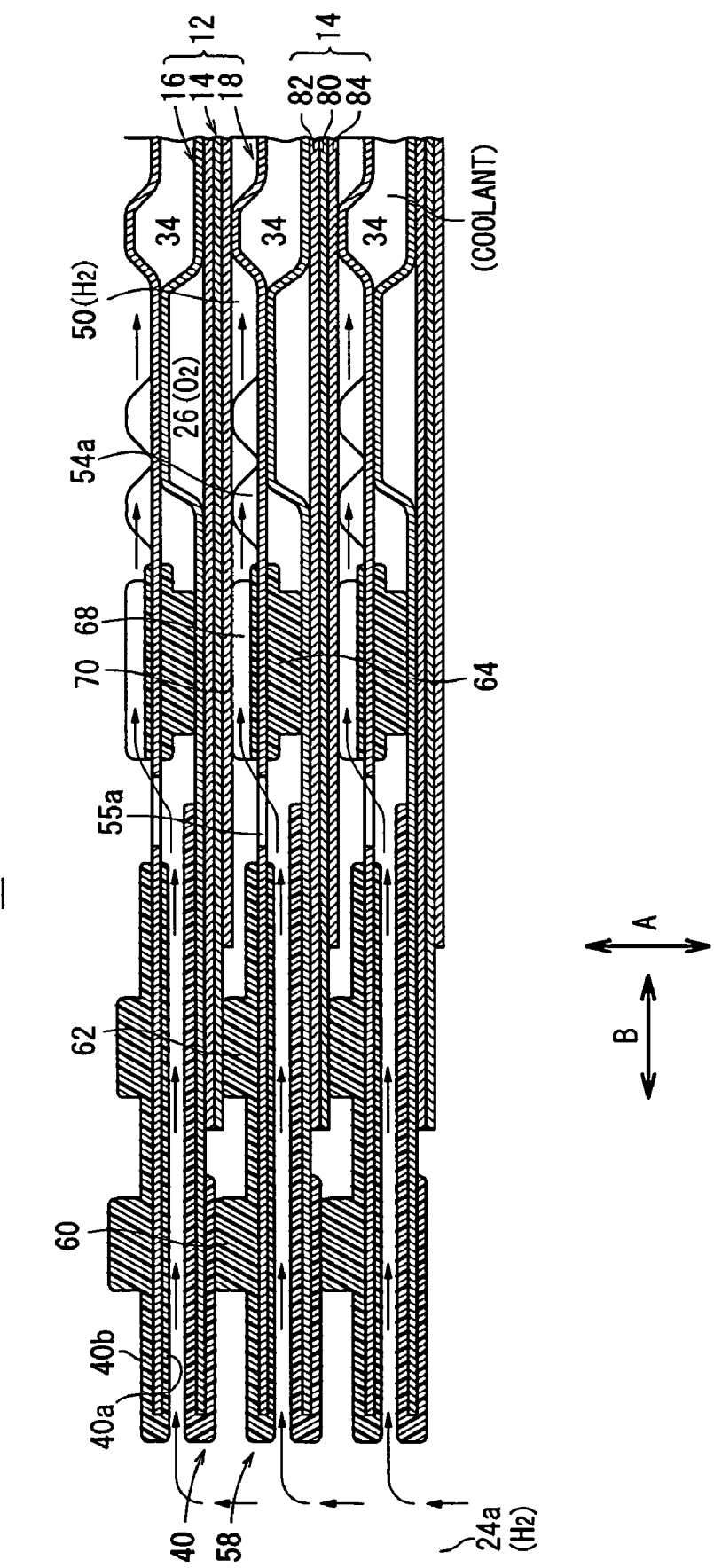
FIG. 2 is a cross sectional view showing the fuel cell, taken along a line II-II in FIG. 1.

FIG. 1 is an exploded perspective view showing main components of a power generation cell 12 of a fuel cell 10 according a first embodiment of the present invention. FIG. 2 is a cross sectional view showing the fuel cell 10 formed by stacking a plurality of power generation cells 12 in a horizontal direction indicated by an arrow A, taken along a line II-II in FIG. 1.

As shown in FIG. 1, the power generation cell 12 includes a membrane electrode assembly 14 and an anode side metal separator (first metal separator) 18 and a cathode side metal separator (second metal separator) 16 sandwiching the membrane electrode assembly 14. The cathode side metal separator 16 and the anode side metal separator 18 are thin metal plates such as steel plates, stainless steel plates, aluminum plates, or plated steel sheets.

At one end of the power generation cell 12 in a horizontal direction indicated by an arrow B in FIG. 1, an oxygen-containing gas supply passage 20a for supplying an oxygen-containing gas, a coolant discharge passage 22b for discharging a coolant, and a fuel gas discharge passage 24b for discharging a fuel gas such as a hydrogen-containing gas are arranged vertically in a direction indicated by an arrow C. The oxygen-containing gas supply passage 20a, the coolant discharge passage 22b, and the fuel gas discharge passage 24b extend through the power generation cell 12 in the direction indicated by the arrow A.

At the other end of the power generation cell 12 in the direction indicated by the arrow B, a fuel gas supply passage 24a for supplying the fuel gas, a coolant supply passage 22a for supplying the coolant, and an oxygen-containing gas discharge passage 20b for discharging the oxygen-containing gas are arranged in the direction indicated by the arrow C. The fuel gas supply passage 24a, the coolant supply passage 22a, and the oxygen-containing gas discharge passage 20b extend through the power generation cell 12 in the direction indicated by the arrow A.

The cathode side metal separator 16 has an oxygen-containing gas flow field 26 on its surface 16a facing the membrane electrode assembly 14. The cathode side metal separator 16 is corrugated to define a plurality of grooves 28 of the oxygen-containing gas flow field 26. The grooves 28 extend in a serpentine pattern having, e.g., two turn regions and three straight regions for allowing the oxygen-containing gas to flow back and forth in the direction indicated by the arrow B. The oxygen-containing gas flow field 26 is connected to the oxygen-containing gas supply passage 20a through an inlet buffer 32a, and connected to the oxygen-containing gas discharge passage 20b through an outlet buffer 32b. For example, the inlet buffer 32a and the outlet buffer 32b include bosses or dimples, respectively.

Figure 3:
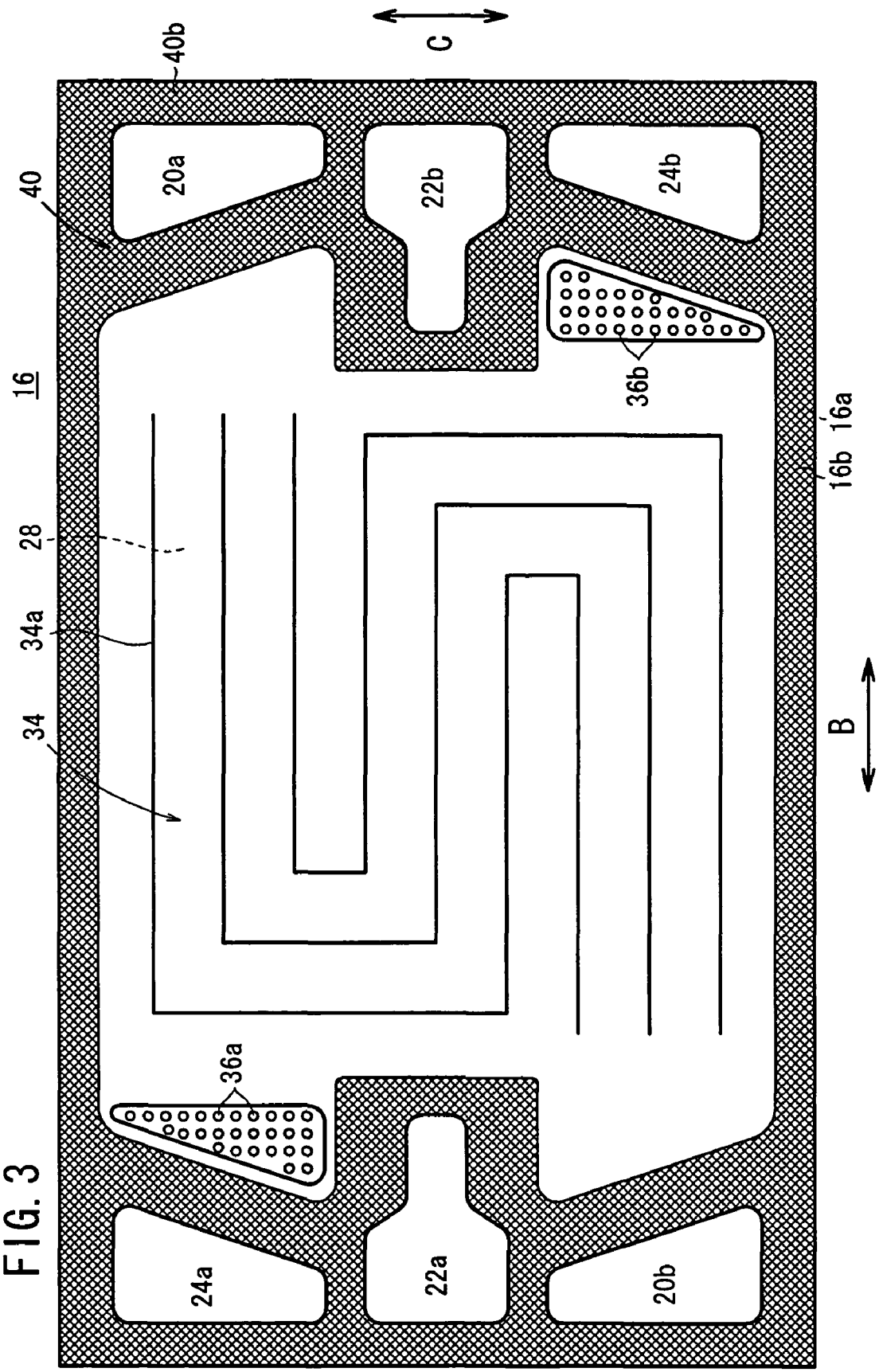
FIG. 3 is a front view showing a first metal separator of the power generation cell.

As shown in FIG. 3, a plurality of grooves 34a as part of a coolant flow field 34 are formed on the other surface 16b of the cathode side metal separator 16. The shape of the grooves 34a of the coolant flow field 34 corresponds to the shape of the grooves 28 of the oxygen-containing gas flow field 26. The grooves 34a are connected to the coolant supply passage 22a and the coolant discharge passage 22b through an inlet buffer 36a and an outlet buffer 36b including bosses or dimples, respectively.

A first seal member 40 is formed integrally on the surfaces 16a, 16b of the cathode side metal separator 16, e.g., by baking or injection molding around the outer end of the cathode side metal separator 16. The first seal member 40 covers the inner surfaces of the oxygen-containing gas supply passage 20a, the coolant discharge passage 22b, the fuel gas discharge passage 24b, the fuel gas supply passage 24a, the coolant supply passage 22a, and the oxygen-containing gas discharge passage 20b. The first seal member 40 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

The first seal member 40 has a planar shape. As shown in FIG. 1, a first planar seal 40a is formed on the surface 16a. The first planar seal 40a prevents leakage of the oxygen-containing gas, while allowing the oxygen-containing gas to flow between the oxygen-containing gas flow field 26 and the oxygen-containing gas supply passage 20a, and between the oxygen-containing gas flow field 26 and the oxygen-containing gas discharge passage 20b. As shown in FIG. 3, a second planar seal 40b is formed on the surface 16b. The second planar seal 40b prevents leakage of the coolant, while allowing the coolant to flow between the coolant supply passage 22a and the coolant flow field 34, and between the coolant flow field 34 and the coolant discharge passage 22b. The second planar seal 40b is longer (wider) than the first planar seal 40a (see FIG. 2).

Figure 4:
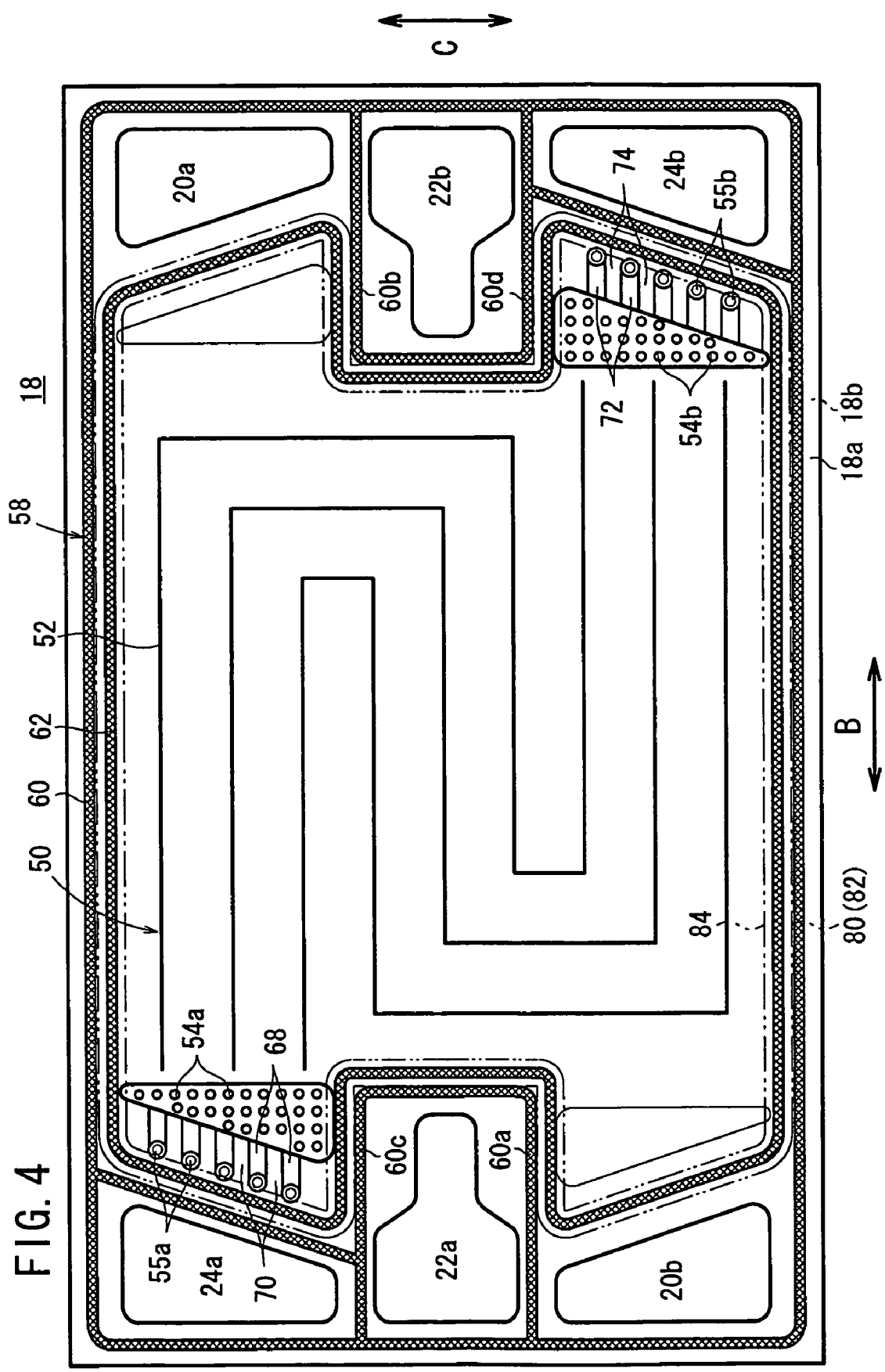
FIG. 4 is a front view showing one surface of a second metal separator of the power generation cell.

As shown in FIG. 4, the anode side metal separator 18 has a fuel gas flow field 50 on its surface (first surface) 18a facing the membrane electrode assembly 14. The anode side metal separator 18 is corrugated to define a plurality of grooves 52 of the fuel gas flow field 50. The grooves 52 extend in a serpentine pattern having two turn regions and three straight regions for allowing the fuel gas to flow back and forth in the direction indicated by the arrow B.

The fuel gas flow field 50 is connected to the fuel gas supply passage 24a on the surface (second surface) 18b through an inlet buffer 54a and inlet through holes 55a, and connected to the fuel gas discharge passage 24b on the surface 18b through an outlet buffer 54b and outlet through holes 55b.

Figure 5:
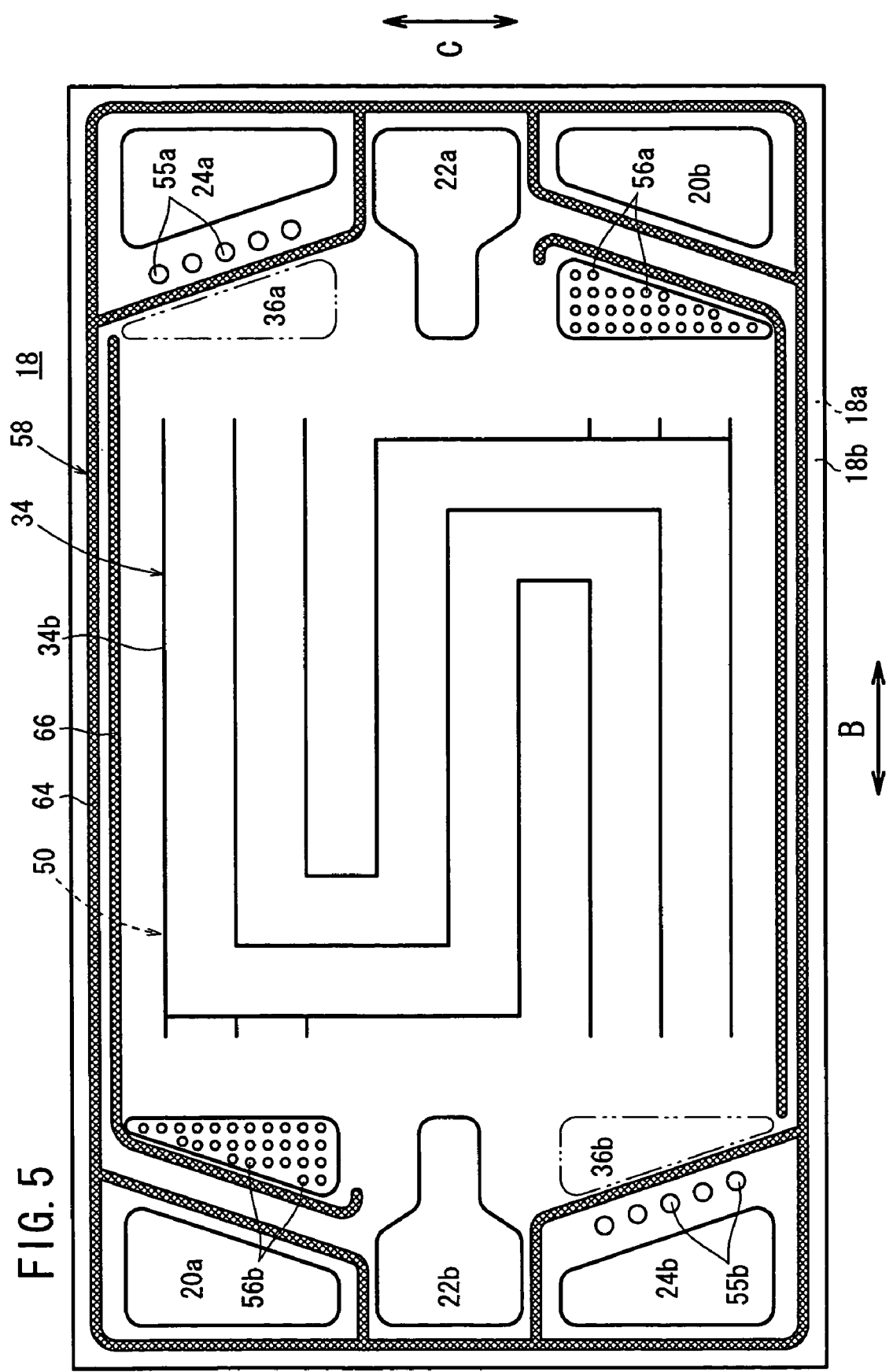
FIG. 5 is a front view showing the other surface of the second metal separator.

As shown in FIGS. 1 and 5, the anode side metal separator 18 has grooves 34b as part of the coolant flow field 34 on the surface 18b opposite to the surface 18a. The shape of the grooves 34b of the coolant flow field 34 corresponds to the shape of the grooves 52 of the fuel gas flow field 50. The grooves 34b are connected to the coolant supply passage 22a through an inlet buffer 56a, and connected to the coolant discharge passage 22b through an outlet buffer 56b.

A second seal member 58 is formed integrally on the surfaces 18a, 18b of the anode side metal separator 18 around the outer end of the anode side metal separator 18. The second seal member 58 covers the inner surfaces of the oxygen-containing gas supply passage 20a, the coolant discharge passage 22b, the fuel gas discharge passage 24b, the fuel gas supply passage 24a, the coolant supply passage 22a, and the oxygen-containing gas discharge passage 20b. The material of the second seal member 58 is the same as the material of the first seal member 40.

As shown in FIG. 4, the second seal member 58 includes an outer protrusion 60 and an inner protrusion 62 on the surface 18a of the anode side metal separator 18. The inner protrusion 62 is spaced inwardly from the outer protrusion 60 by a predetermined distance. The inner protrusion 62 contacts an outer marginal region of a solid polymer electrolyte membrane 80 as described later to close the fuel gas flow field 50 (see FIG. 2).

As shown in FIG. 5, the second seal member 58 includes an outer protrusion 64 and an inner protrusion 66 on the surface 18b of the anode side metal separator 18. The inner protrusion 66 is spaced inwardly from the outer protrusion 64 by a predetermined distance, and surrounds the coolant flow field 34.

Figure 6:
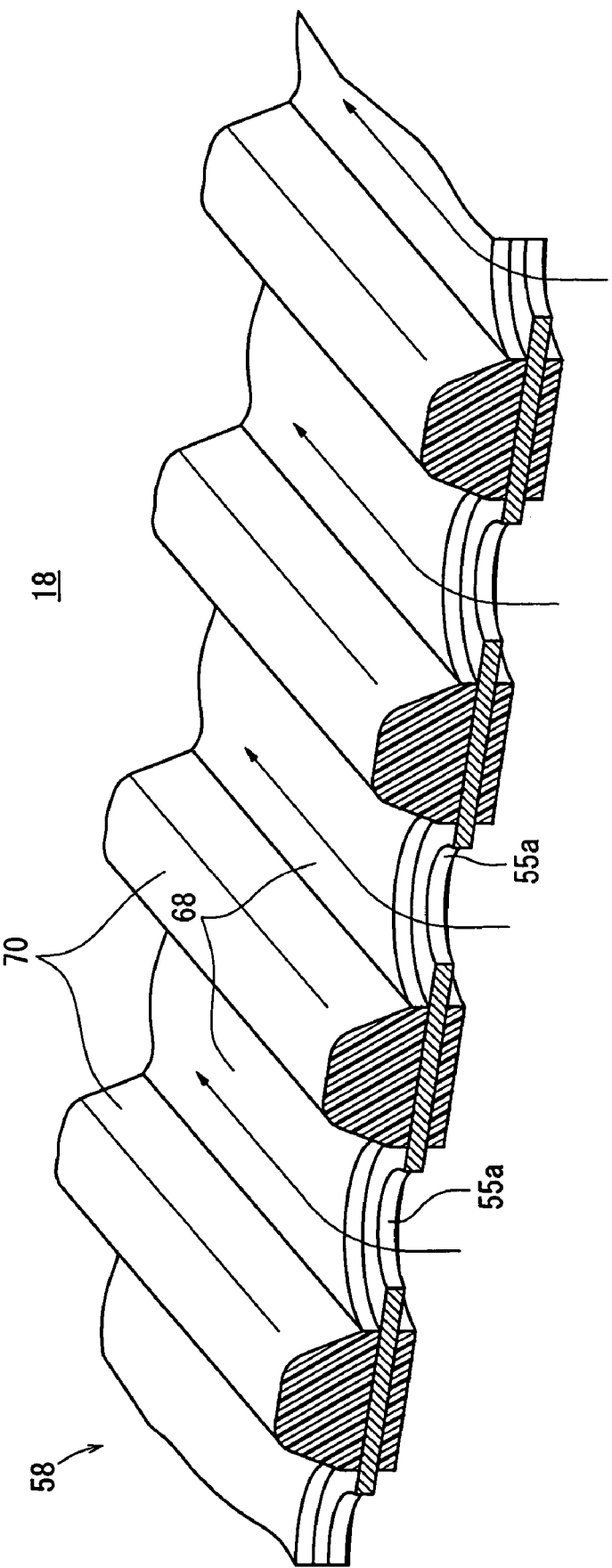
FIG. 6 is a perspective view showing a state in which the second metal separator is cut along inlet through holes.

As shown in FIGS. 4 and 6, the second seal member 58 includes a plurality of flow grooves 68 and a plurality of receivers 70 which are arranged alternately. The flow grooves 68 guide the fuel gas from the inlet through holes 55a to the fuel gas flow field 50 through the inlet buffer 54a, and the receivers 70 directly contact an anode 84 as described later.

Further, as shown in FIG. 4, the second seal member 58 includes a plurality of flow grooves 72 and a plurality of receivers 74 which are arranged alternately. The flow grooves 72 guide the consumed fuel gas from the fuel gas flow field 50 through the outlet buffer 54b into the outlet through holes 55b, and the receivers 74 directly contact the anode 84.

As shown in FIG. 1, at opposite ends of the membrane electrode assembly 14 in the direction directed by the arrow B, central portions of the membrane electrode assembly 14 are cut away inwardly. As shown in FIGS. 1 and 2, the membrane electrode assembly 14 comprises the anode (first electrode) 84, a cathode (second electrode) 82, and the solid polymer electrolyte membrane 80 interposed between the anode 84 and the cathode 82. The solid polymer electrolyte membrane 80 is formed by impregnating a thin membrane of perfluorosulfonic acid with water, for example. The surface area of the anode 84 is smaller than the surface area of the cathode 82.

Each of the cathode 82 and the anode 84 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 82 and the electrode catalyst layer of the anode 84 are fixed to both surfaces of the solid polymer electrolyte membrane 80, respectively.

Next, operation of the fuel cell 10 will be described.

As shown in FIG. 1, a fuel gas such as a hydrogen-containing gas is supplied to the fuel gas supply passage 24a, an oxygen-containing gas is supplied to the oxygen-containing gas supply passage 20a, and a coolant such as pure water, ethylene glycol, or oil is supplied to the coolant supply passage 22a.

Thus, as shown in FIGS. 1, 2 and 4, the fuel gas from the fuel gas supply passage 24a moves from the surface 18b to the surface 18a of the anode side metal separator 18 through the inlet through holes 55a. Then, the fuel gas flows through the inlet buffer 54a, and flows into the fuel gas flow field 50 of the anode side metal separator 18. The fuel gas flows back and forth in the direction indicated by the arrow B, and is supplied to the anode 84 of the membrane electrode assembly 14.

As shown in FIG. 1, the oxygen-containing gas from the oxygen-containing gas supply passage 20a flows through the inlet buffer 32a, and flows into the oxygen-containing gas flow field 26 of the cathode side metal separator 16. The oxygen-containing gas flows back and forth in the direction indicated by the arrow B, and is supplied to the cathode 82 of the membrane electrode assembly 14.

Thus, in the membrane electrode assembly 14, the fuel gas supplied to the anode 84 and the oxygen-containing gas supplied to the cathode 82 are consumed in the electrochemical reactions at catalyst layers of the anode 84 and the cathode 82 for generating electricity.

After the fuel gas is consumed at the anode 84, the fuel gas flows from the outlet buffer 54b toward the surface 18b through the outlet through holes 55b, and is discharged in the direction indicated by the arrow A along the fuel gas discharge passage 24b (see FIGS. 1 and 4). Likewise, after the oxygen-containing gas is consumed at the cathode 82, the oxygen-containing gas from the outlet buffer 32b is discharged in the direction indicated by the arrow A along the oxygen-containing gas discharge passage 20b (see FIG. 1).

Further, the coolant supplied to the coolant supply passage 22a flows through the inlet buffers 36a, 56a, and flows into the coolant flow field 34 between the cathode side metal separator 16 and the anode side metal separator 18. After the coolant is used for cooling the membrane electrode assembly 14, the coolant flows through the outlet buffers 36b, 56b, and is discharged into the coolant discharge passage 22b.

In the first embodiment, as shown in FIGS. 2, 4, and 6, the second seal member 58 includes the flow grooves 68 and the receivers 70 which are arranged alternately. The flow grooves 68 guide the fuel gas from the inlet through holes 55a to the fuel gas flow field 50 through the inlet buffer 54a, and the receivers 70 directly contact the anode 84.

Therefore, the fuel gas flowing from the surface 18b to the surface 18a of the anode side metal separator 18 through the inlet through holes 55a is smoothly and reliably supplied to the fuel gas flow field 50 through the flow grooves 68 of the second seal member 58.

The second seal member 58 includes the flow grooves 68 and the receivers 70 which are arranged alternately. The receivers 70 directly contact the anode 84 of the membrane electrode assembly 14. The surface area of the anode 84 is smaller than the surface area of the cathode 82. In this structure, when a tightening load is applied to the fuel cell 10 in the stacking direction, the anode 84 is reliably held by the receivers 70. Thus, with a simple and compact structure, it is possible to suitably prevent damage of the membrane electrode assembly 14, and to apply uniform surface pressure to the membrane electrode assembly 14 to improve power generation performance.

Further, the second seal member 58 includes the flow grooves 72 and the receivers 74 which are arranged alternately. The flow grooves 72 are provided for discharging the fuel gas from the fuel gas flow field 50 to the outlet through holes 55b. Therefore, the same advantages as described above can be obtained.

Figure 7:
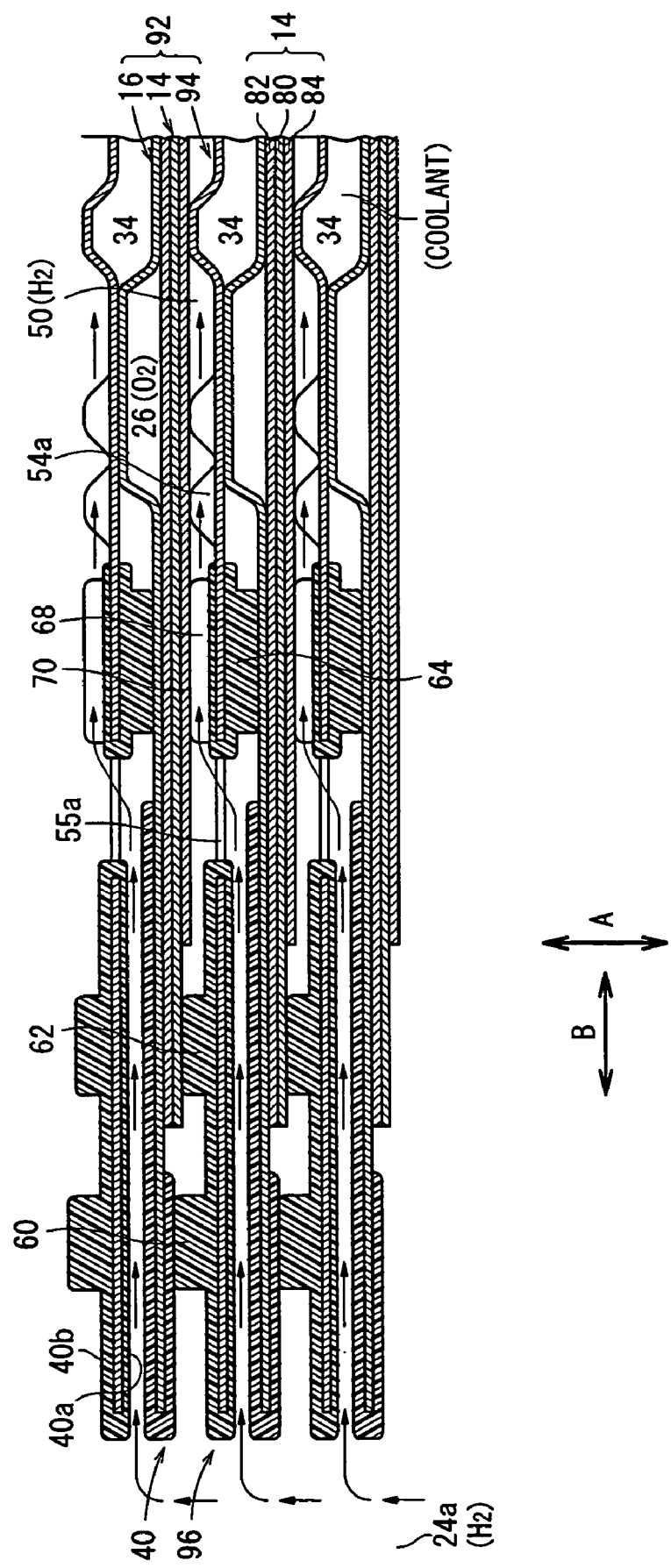
FIG. 7 is a cross sectional view showing a fuel cell according to a second embodiment.

FIG. 7 is a cross sectional view showing a fuel cell 90 according to a second embodiment of the present invention. In FIG. 7, the constituent elements that are identical to those of the fuel cell 10 according to the first embodiment are labeled with the same reference numeral, and description thereof will be omitted.

The fuel cell 90 includes a plurality of power generation cells 92. Each of the power generation cells 92 includes the membrane electrode assembly 14, and the cathode side metal separator 16 and an anode side metal separator (first metal separator) 94 sandwiching the membrane electrode assembly 14. A second seal member 96 is formed integrally on the anode side metal separator 94 around an outer end of the anode side metal separator 94.

Figure 8:
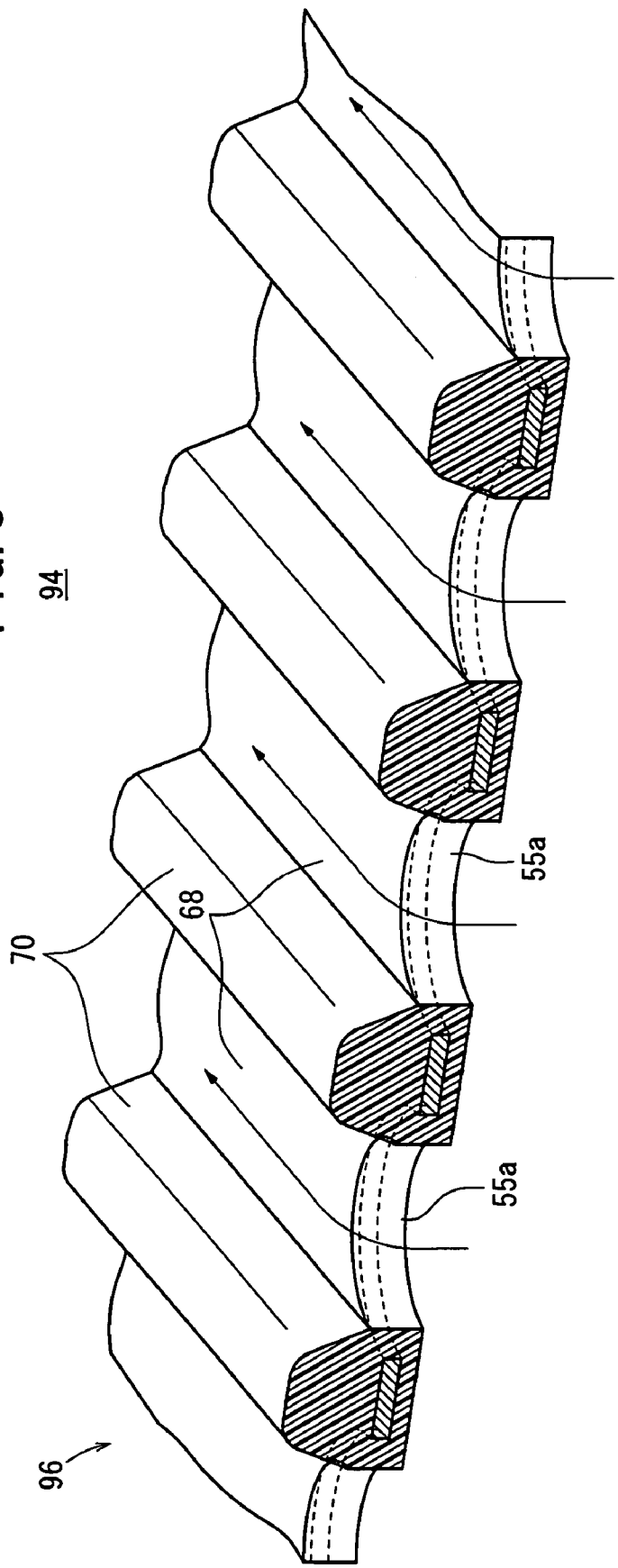
FIG. 8 is a perspective view showing a state in which a second metal separator of the fuel cell is cut along inlet through holes.
Figure 9:
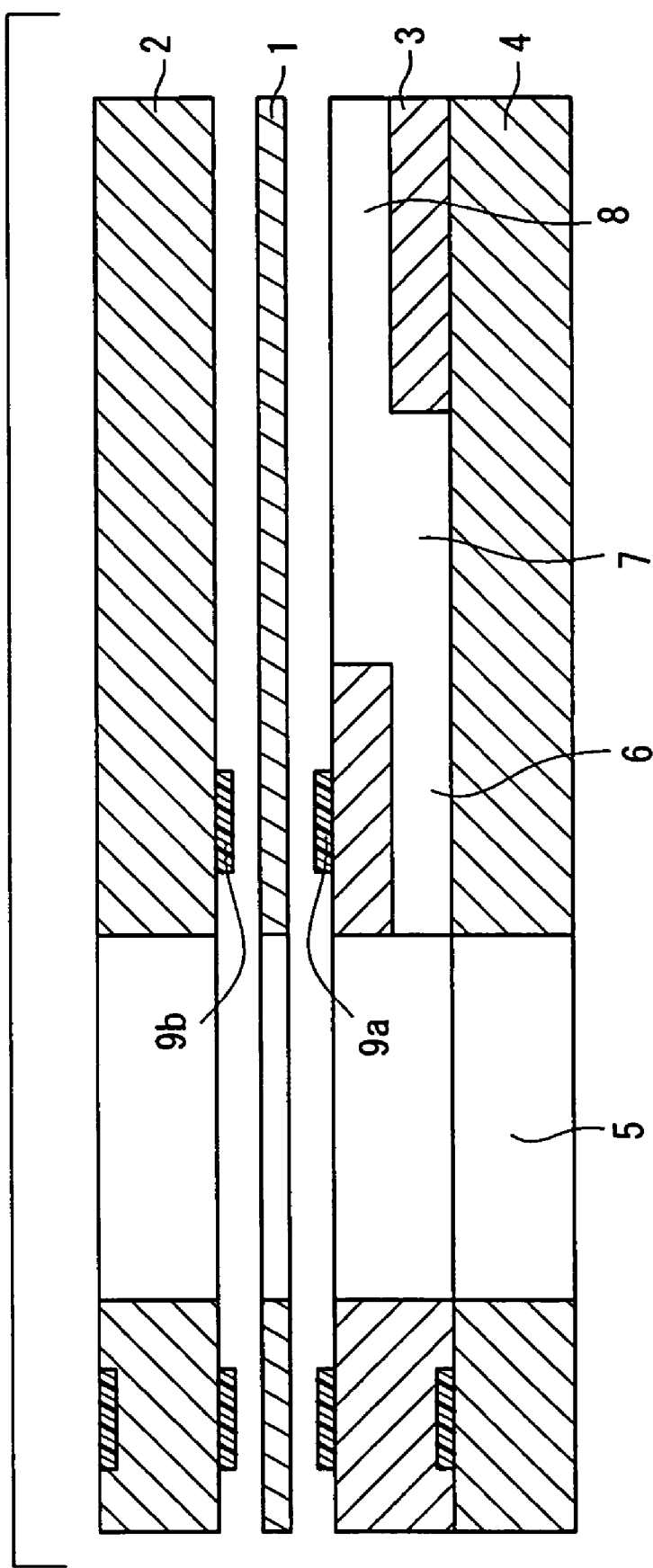
FIG. 9 is a partial cross sectional view showing a conventional fuel cell.

As shown in FIGS. 7 and 8, the second seal member 96 covers inner walls of inlet through holes 55a. At the inlet through holes 55a, the second seal member 96 includes a plurality of flow grooves 68 and a plurality of receivers 70 which are arranged alternately. The flow grooves 68 guide the fuel gas from the inlet through holes 55a to the fuel gas flow field 50 through the inlet buffer 54a, and the receivers 70 directly contact the anode 84.

Further, though not shown, the second seal member 96 also covers inner walls of outlet through holes 55b. At the outlet through holes 55b, the second seal member 96 also includes a plurality of flow grooves and a plurality of receivers which are arranged alternately. The flow grooves guide the consumed fuel gas from the fuel gas flow field 50 into the outlet through holes 55b through the outlet buffer 54b, and the receivers directly contact the anode 84.

In the second embodiment, the second seal member 96 is formed integrally with the anode side metal separator 94. The second seal member 96 covers the inner walls of the inlet through holes 55a. Therefore, elution of metal ions from the inner walls of the inlet through holes 55a is prevented. Further, it is possible to reliably suppress the occurrence of electrical corrosion in the anode side metal separator 94.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking a membrane electrode assembly between a pair of first and second metal separators in a stacking direction, said membrane electrode assembly including first and second electrodes and an electrolyte interposed between said first and second electrodes, the surface area of said second electrode being larger than the surface area of said first electrode, a reactant gas passage for at least one reactant gas extending through said fuel cell in the stacking direction, wherein said first metal separator comprises:
a reactant gas flow field formed on a first surface of said first metal separator facing said first electrode for supplying said reactant gas to said first electrode; and
a through hole for allowing said reactant gas supplied from said reactant gas passage into a second surface of said first metal separator to move toward said first surface to supply said reactant gas to said reactant gas flow field;

and wherein:
a seal member is formed integrally with said first metal separator,
the seal member is made of a material different than a metal material of the first metal separator,
said seal member includes a plurality of flow grooves for guiding said reactant gas from said through hole toward said reactant gas flow field and a plurality of receivers which directly contact said first electrode, and
said flow grooves and said receivers are alternately arranged.

2. A fuel cell according to claim 1, wherein a buffer is formed between said reactant gas flow field and said through hole, and ends of said flow grooves are positioned at said buffer.

3. A fuel cell according to claim 1, wherein said reactant gas flow field comprises a groove in a serpentine pattern.

4. A fuel cell according to claim 1, wherein said seal member covers an inner wall of said through hole.

5. A fuel cell according to claim 1, wherein said first electrode is an anode, and said reactant gas is a fuel gas.

6. A fuel cell formed by stacking a membrane electrode assembly between a pair of first and second metal separators in a stacking direction, said membrane electrode assembly including first and second electrodes and an electrolyte interposed between said first and second electrodes, the surface area of said second electrode being larger than the surface area of said first electrode, a reactant gas passage for at least one reactant gas extending through said fuel cell in the stacking direction, wherein said first metal separator comprises:
a reactant gas flow field formed on a first surface of said first metal separator facing said first electrode for supplying said reactant gas to said first electrode; and
a through hole for allowing said reactant gas supplied to said reactant gas flow field to move toward a second surface of said first metal separator to discharge said reactant gas into said reactant gas passage;

and wherein:
a seal member is formed integrally with said first metal separator,
the seal member is made of a material different than a metal material of the first metal separator,
said seal member includes a plurality of flow grooves for guiding said reactant gas from said reactant gas flow field to said through hole and a plurality of receivers which directly contact said first electrode, and
said flow grooves and said receivers are alternately arranged.

7. A fuel cell according to claim 6, wherein a buffer is formed between said reactant gas flow field and said through hole, and ends of said flow grooves are positioned at said buffer.

8. A fuel cell according to claim 6, wherein said reactant gas flow field comprises a groove in a serpentine pattern.

9. A fuel cell according to claim 6, wherein said seal member covers an inner wall of said through hole.

10. A fuel cell according to claim 6, wherein said first electrode is an anode, and said reactant gas is a fuel gas.

* * * * *